US006304894B1

United States Patent
Nakayama et al.

(10) Patent No.: US 6,304,894 B1
(45) Date of Patent: Oct. 16, 2001

(54) PROXY SERVER AND RECORDING MEDIUM STORING A PROXY SERVER PROGRAM

(75) Inventors: Yoshiyuki Nakayama; Naomichi Nonaka, both of Kawasaki; Ryoji Higashizono, Yokohama, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/157,563

(22) Filed: Sep. 21, 1998

(30) Foreign Application Priority Data

Sep. 22, 1997 (JP) .................................................. 9-256800

(51) Int. Cl.[7] .......................... G06F 15/16; G06F 13/38; G06F 15/177
(52) U.S. Cl. ......................... 709/203; 709/202; 709/217; 709/219
(58) Field of Search ................................... 709/202, 203, 709/205, 206, 217, 219

(56) References Cited

U.S. PATENT DOCUMENTS

| 5,517,645 | 5/1996 | Stutz et al. . |
| 5,710,925 | 1/1998 | Leach et al. . |
| 5,802,292 | * 9/1998 | Mogul ................................. 709/203 |
| 5,935,207 | * 8/1999 | Logue et al. ......................... 709/219 |
| 6,073,168 | * 6/2000 | Mighdoll et al. ..................... 709/217 |
| 6,085,193 | * 7/2000 | Malkin et al. ......................... 707/10 |
| 6,128,644 | * 10/2000 | Nokazi ................................. 709/203 |

OTHER PUBLICATIONS

C. Bormann et al, "Xme and Xy—Scalable Window Sharing and Mobility or From X Protocol Multiplexing to X Protocol Multicasting", The X Resource, Issue 9, pp. 205–210.

* cited by examiner

Primary Examiner—Mark H. Rinehart
Assistant Examiner—Paul Kang
(74) Attorney, Agent, or Firm—Mattingly, Stanger & Malur, P.C.

(57) ABSTRACT

The proxy server notifies a client of the entry information instead of the server and includes means for obtaining from the server entry information used for accessing a function that the server can supply to the client according to the request from the client. The proxy server also includes means for creating entry information used for accessing a function enabled for the client to use, with reference to the obtained entry information. Also, the proxy server includes means for notifying the client of the created entry information. The proxy server may contain some functions that can be independently supplied to the client without involving the server.

20 Claims, 9 Drawing Sheets

PROXY SERVER AND RECORDING MEDIUM STORING A PROXY SERVER PROGRAM

BACKGROUND OF THE INVENTION

The present invention relates to a technology for changing functions that can be supplied to client programs in a client server system such as, for example, an X window system, without amending an existing server program. While the present invention is discussed in the client server system environment, it should be understood that this invention can be applied to any address-type interface between any two programs.

A conventional system is known for realizing desired functions by linking a server program with client programs. In such a system, the server program notifies each client program of usable functions. A client program requests a specific function selected from among the functions notified from the server program. Upon receiving the request, the server program supplies the function to the client program.

The system described above is generally referred to as a client server system (CSS). From here on, such a client server system will be explained by way of an X window system, which is a client server type window system.

In an X window system, the server program (X server) displays a window and draws patterns in the window displayed on a display screen of a computer that is executing the server program in response to a request from a client program (application program). In addition, the server program, when receiving a user instruction entered by an input device, notifies the client program of the received instruction.

On the other hand, the client program asks the server program to supply various functions for displaying a window, drawing patterns in the window, etc. on the display screen. In addition, the client program executes desired processings according to the contents of a user instruction, etc. notified from the server program. As such, the X window system allows the server program to be linked with client programs to realize a graphical user interface (GUI) which is used by users to communicate with the computer.

In a conventional client server system, the functions supplied by the server program are usually fixed. In addition, each client program is created on the premise that the client program will use such fixed functions of the server program. Consequently, in a client server system in which the server program notifies each client program of usable functions and each client program requests its desired functions selected from among the functions notified from the server program, it is impossible for the client program to increase and reduce usable functions without amending the server program. Thus, the system has a problem that it is not flexible for such operations.

For example, when a new hardware appears, a client program will want to increase existing usable functions to make maximum use of the hardware ability. In such a case, in the case of the conventional client server system, functions that are not supplied originally by the server program must be added to the server program and accordingly the server program must be amended.

Furthermore, for some functions supplied by the server program to client programs, client programs can execute those functions faster than the server program executes them. In some cases, a user may thus want to suppress supply of those functions from the server program. In such a case, the conventional client server system must delete the functions from the server program and accordingly amend the server program.

For the X window system explained above, there is proposed a technology of using a server program, which is a pseudo X server, between each client program (application program) and the server program (real X server) to which client programs are to be connected to ease the restriction that allows the server program to be connected to each client program at 1:1. (The technology is discussed in Carsten Bormann and Gero Hoffmann's article entitled "Xmc and Xy-Scalable Window Sharing and Mobility or From X Protocol Multiplexing to X Protocol Multicasting", pp. 205–210, Issue 9, The X Resource.)

This technology demands that each client program should be connected to the pseudo X server instead of the real X server by changing the address given to the client program. In addition, the pseudo X server is connected to the real X server, so that the client program can access the real X server via the pseudo X server. Consequently, this technology changes over the real X server to which the pseudo X server is to be connected so that the client program can request a plurality of real X servers for supply of desired functions. More concretely, the client program can display a window on the display screen of each of the plurality of computers in which a server program (real X server) is executed and display patterns, etc. in the window respectively. This technology, however, is not used to change the protocol (X protocol) for defining data exchanges between each client program and the server program.

In other words, this technology changes over the connection between the pseudo X server and the real X server so that each client program can access a plurality of real X servers and accordingly the restriction for connecting the server program to each client program at 1:1 is eased. The functions supplied to each client program via the pseudo X server are thus completely the same as those supplied by the real X server. Such technology that uses the above pseudo X servers does not take into consideration increasing and reducing functions that can be used by client programs.

SUMMARY OF THE INVENTION

Under such the circumstances, it is an object of the present invention to provide a technology for changing functions that can be supplied to client programs without amending the existing server program.

Particularly, it is an object of the present invention to provide a technology of increasing or reducing functions that can be supplied to client programs without amending the existing server program.

Furthermore, it is an object of the present invention to provide a technology capable of actuating new hardware by conventional software. This technology can dispense with the necessity of fabricating a complicated product including an old interface.

Moreover, it is another object of the present invention to provide a communication technology of increasing or reducing functions that can be supplied to client programs from the server program.

Additionally, it is a further object of the present invention to provide a program, a component or an object equipped with each of the above technologies.

In addition, it is a still further object of the present invention to provide a device in which software equipped with each of the above technologies is installed.

In order to solve the above-mentioned conventional problems, the proxy client server system of the present invention includes a client and a server that notifies the client of entry information for accessing a desired function according to the request from the client and supplies the function corresponding to the address accessed by the client, wherein the server of the present invention, which is a proxy server that notifies the client of the above entry information instead of the server, further includes first means of obtaining from the server entry information used for accessing a function that can be supplied from the server to the client;

second means of creating entry information for accessing a function enabled for the client to use, with reference to the obtained entry information; and third means of notifying the client of the created entry information.

Herein, the server signifies a server program for supplying functions (services) mainly at the request of other units. The client signifies a client program for requesting the server program to supply the functions. Thus, both the client and the server may be actuated inside one and the same information processing unit, or the proxy server may function as both the client and the server.

According to the present invention, a proxy server notifies each client of entry information of usable functions instead of a server. In addition, the proxy server references entry information, obtained from a server and used to access a function that can be supplied from the server to each client, to create entry information for functions enabled for each client to use. With this, functions that can be supplied to each client program executed by a client can be changed without amending the server program executed by the server.

For example, when a proxy server has functions and the server can supply the functions to clients on its terms, the proxy server creates entry information of the functions enabled for clients to use, including the addresses of the functions. Thus, the functions that can be supplied to client programs executed by clients can be increased without amending the server program executed by the server.

Furthermore, for example, a proxy server creates entry information of the functions that the proxy server enables clients to use without including the addresses described in the entry information of the functions that can be supplied from a server to clients or addresses used for accessing the addresses. With this, the functions that can be supplied to client programs executed by clients can be reduced without amending the server program executed by the server.

If, when a server includes an address described already in the entry information of a function that can be supplied to its clients in the entry information of a function that the proxy server enables its clients to use, one of the clients accesses the address, then the server supplies the function to the client directly. The proxy server does not take part in this processing.

On the other hand, if, when a proxy server includes an address used to access an address described in the entry information of a function that can be supplied from a server to its clients in the entry information of a function that the proxy server enables one of its clients to use, one of the client accesses the address, then the proxy server accesses the server again to request supply of the function. Thus, the proxy server can monitor how clients access the server, which is effective for debugging, etc.

The recording medium of the present invention, on which a proxy server program is stored and used in a client server system, includes a client program; and a server program that notifies the client program of the entry information used to access a desired function according to a request from the client program and supplies the function corresponding to the address accessed by the client program to the client program, wherein the recording medium storing a proxy server program that notifies the client program of the entry information instead of the server program, and the proxy server program instructs an information processing unit to execute processings in the following steps of;

obtaining from the server program the entry information used to access a function that can be supplied from the server program to the client program according to a request from the client program;

creating the entry information used to access a function enabled for the client program to use, with reference to the obtained entry information; and notifying the client program of the created entry information.

As explained above, according to the present invention, it is possible to increase and reduce the functions that can be supplied to a client program without amending any of the existing client programs and the server program.

These and other objects, features and advantages of the present invention will become more apparent in view of the following detailed description of the present invention in conjunction with the drawings.

DETAILED DESCRIPTION OF THE PREFERRED EMBODIMENTS

The client server system according to an embodiment of the present invention will now be explained with reference to the attached drawings.

According to one embodiment of the present invention, the client server system refers to a form of wide-ranged software including the relationship between a program (server program) that supplies functions (services) by receiving requests, mainly those from other units and each program (client program) that requests supply of functions to the server program.

The above function designates, for example, at least one application program interface (API). The program described herein includes a process, a thread and a task. The client server system includes a software configuration which makes behavior of a client server type in one and the same information processing unit such as inter-process communications managed by an operating system (OS), communications via networks using sockets, and inter-object communications in a distributed environment.

For example, in addition to general client server systems, in which client programs and a server program are linked to each other, to control windows, data bases, or hardware, the client server system of this embodiment also includes the relationship between each application program and a display driver that draws patterns on a display by receiving requests from the application program. Also, the server is capable of performing a certain set of functions and one client is interested in one subset of those functions while another client is interested in another subset of those functions.

Figure 1:
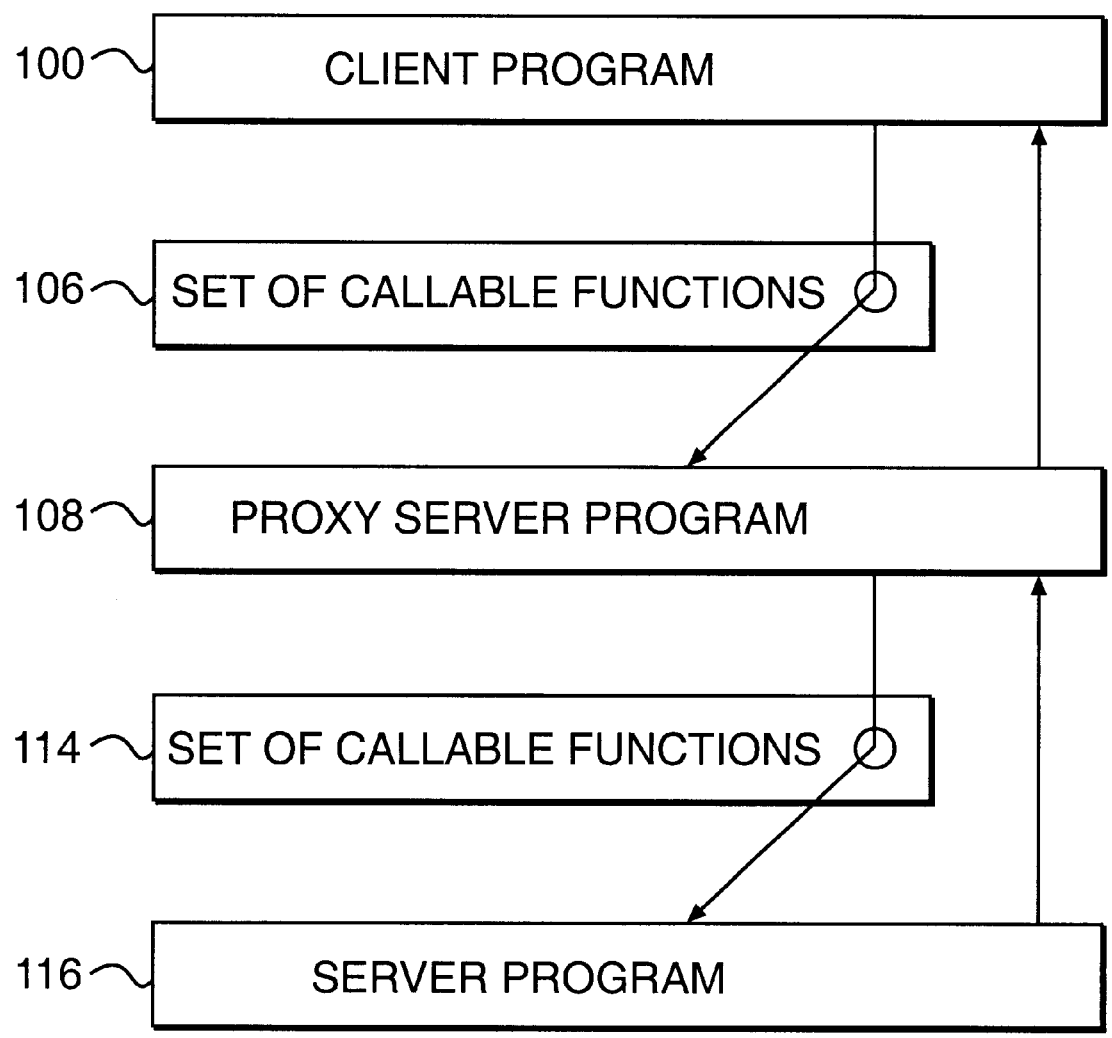
FIG. 1 illustrates a positional relationship among programs that form a client server system in an embodiment of the present invention.

FIG. 1 illustrates a positional relationship between such programs as forming a client server system in an example of the present invention. In this embodiment, an operation system (OS) changes the address of a server program to be given to a client program 100, to instruct the client program 100 to be connected to a proxy server program 108 instead of the server program 116. In addition, the operating system also instructs the proxy server program 108 to be connected to the server program 116. Consequently, the proxy server program 108 is positioned between the client program 100 and the server program 116 that are linked to each other to form an existing client server system.

The proxy server program 108 may be connected to a plurality of server programs 116 so that the proxy server program 108 is positioned between the client programs 100 and a plurality of server programs 116. In addition, the server program 116 may also be a proxy server program positioned between another server program and the proxy server program 108.

In FIG. 1, a set of callable functions 106 is the information indicating an address for calling a function that can be supplied from the proxy server program 108 to the client program 100. This set of callable functions 106 includes addresses for directly or indirectly calling the functions that can be supplied from the proxy server program 108 to the client program 100 independently, as well as addresses for calling the functions that can be supplied from the server program 116 to the client program 100.

Here, the set of callable functions 106 is composed of, e.g., a table having the above information described therein, and it may be composed in the form of a set of properties for explaining the server functions returned by the server or a set of methods supplied by a server object.

This set of callable functions 108 is created according to the contents of a request from the client program 100 with reference to a set of callable functions 114 to be explained later. The created set of callable functions 108 is then notified to the client program 100. The contents of the set of callable functions 108 are thus changed depending on the contents of the request (indicating the target function to be supplied) from the client program 100.

The set of callable functions 114 is information indicating addresses for calling functions that can be supplied from the server program 116 to the client program 100. This set of callable functions 114 is created according to the contents of a request from the proxy server program 108 and notified to the proxy server program 108. The contents of the set of callable functions 114 are thus changed depending on the contents of the request (indicating the target function to be supplied) from the proxy client program 108.

Like the set of callable functions 106, the set of callable functions 114 is composed of, e.g., a table having the above information described therein, and it may be composed in the form of a set of properties for explaining the server functions returned by the server or a set of methods supplied by a server object.

The above-described request and notification correspond an inquiry and a response, respectively, in "an interface" from a client object to a server object in an object system.

In FIG. 1, referring to the address described in the set of callable functions 106 notified from the proxy server program 108, the client program 100 accesses the address to request supply of the desired function. More particularly, the client program 100 gets an address referring to the set of callable functions 106, and then, it accesses the address used as an argument by utilizing the function of the OS, so as to actually call the functions. An arrow drawn from the client program 100 to the set of callable functions 106 indicates the operation in the present embodiment.

Likewise, the proxy server program 108 accesses the address for calling the functions described in the set of callable functions 114 so as to request the supplying of the desired functions referring to the set of callable functions 114 notified from the server program 116. An arrow drawn from the proxy server program 108 to the set of callable functions 114 indicates the operation in the present embodiment.

In this embodiment, according to the address described in the set of callable functions 106 notified from the proxy server program 108, the client program 100 accesses the address to request supply of the desired function. If the address accessed by the client program 100 is an address used to call a function that the proxy server program 108 can supply to the client program 100 on its own terms, the proxy server program 108 processes the function requested by the client program 100, then supplies the function to the client program 100.

The proxy server program 108 per se may fulfill the request function, may download other programs, components or objects for fulfilling the requested function, or may leave the processing to them.

If the address accessed by the client program 100 is an address used to indirectly call a function that the server program 116 can supply to the client program 100, the proxy server program 108 accesses the address for calling the function, described in the set of callable functions 114 notified by the server program 116 to request the function requested by the client program 100 referring to the set of callable functions 114 notified from the server program 116. The proxy server program 108 also executes another processing concerning the function as needed at this time.

Upon receiving the request, the server program 116 processes the function requested by the proxy server program 108, then supplies the function to the proxy server program 108. The proxy server program 108 then supplies the function supplied from the server program 116 to the client program 100 together with the result of any processing executed as needed.

For example, the proxy server program 108 can pretend to perform parallel processing with respect to a special server program for high speed calculation. That is, the proxy server program 108 can accept a plurality of calculation requests at once to make the server program 116 execute calculations one by one. The proxy server program 108 can supply a function of returning all the calculation results together.

If the address accessed by the client program 100 is an address for directly calling a function that the server program 116 can supply to the client program 100, the server program 116 processes the function requested by the client program 100, then supplies the function to the client program 100.

The proxy server program 108 can create the set of callable functions 106 including the addresses for directly or indirectly calling the function that can be supplied from the server program 116 to the client program 100, in addition to the addresses for calling the functions that can be supplied from the proxy server program itself to the client program on its own terms. Accordingly, functions that can be supplied to the client program 100 can be increased without amending the server program 116.

Furthermore, if any functions that the server program 116 can supply to the client program 100 can be processed by the client program 100 faster than the server program 116, the set of functions that can be supplied to the client program 100 can be reduced without amending the server program 116 by previously providing the proxy server program 108 having the reduced functions. Consequently, the proxy server program 108 can create the set of callable functions 106 so that the addresses of those functions are deleted, even though the set of callable functions 114 is notified by the server program 116. In other words, the functions that can be supplied to the client program 100 can be reduced without amending the server program 116.

A hardware configuration for realizing the client server system of this embodiment will now be explained. The client server system in this embodiment may be considered in two ways. In one way, only one computer is used to process the client program 100, the proxy server program 108, and the server program 116. In another way, a plurality of computers connected to each other via a communication network such as an LAN (Local Area Network) are used to process those programs as distributed processings.

Figure 2:
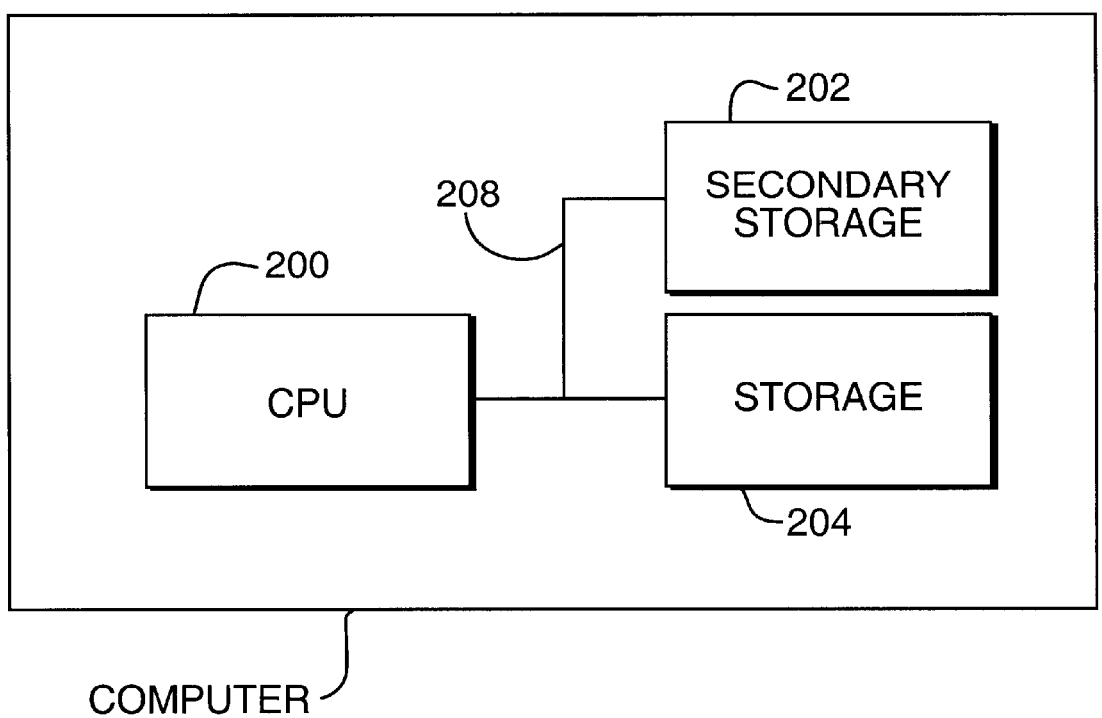
FIG. 2 is a hardware configuration for processing the client program 100, the proxy server program 108, and the server program 116 using one computer.

FIG. 2 illustrates a hardware configuration for processing the client program 100, the proxy server program 108, and the server program 116 using one computer. A CPU (Central Processing Unit) 200 loads a necessary program from a secondary storage 202 provided with a recording medium such as a magnetic disk, optical disk, or the like, on which the client program 100, the proxy server program 108, and the server program 116 are stored into a storage 204 such as a memory, and then processes the program. Numeral 208 indicates a bus used to transfer data mutually among the CPU 200, the secondary storage 202, and the storage 204.

The OS is loaded into the secondary storage 202 or the storage 204.

The program loading function depends on the operating system (OS) installed in the object computer. If the necessary program is already loaded in the storage 204, program loading may be omitted. A program-to-program communicating means supplied by the operating system (OS) is used to transfer data mutually among the programs.

Particularly, it is sufficient to use a message supplied by the OS, network communications utilizing sockets, irrespective of the use of networks, or an inter-object interface in a distributed object environment in recent years.

Figure 3:
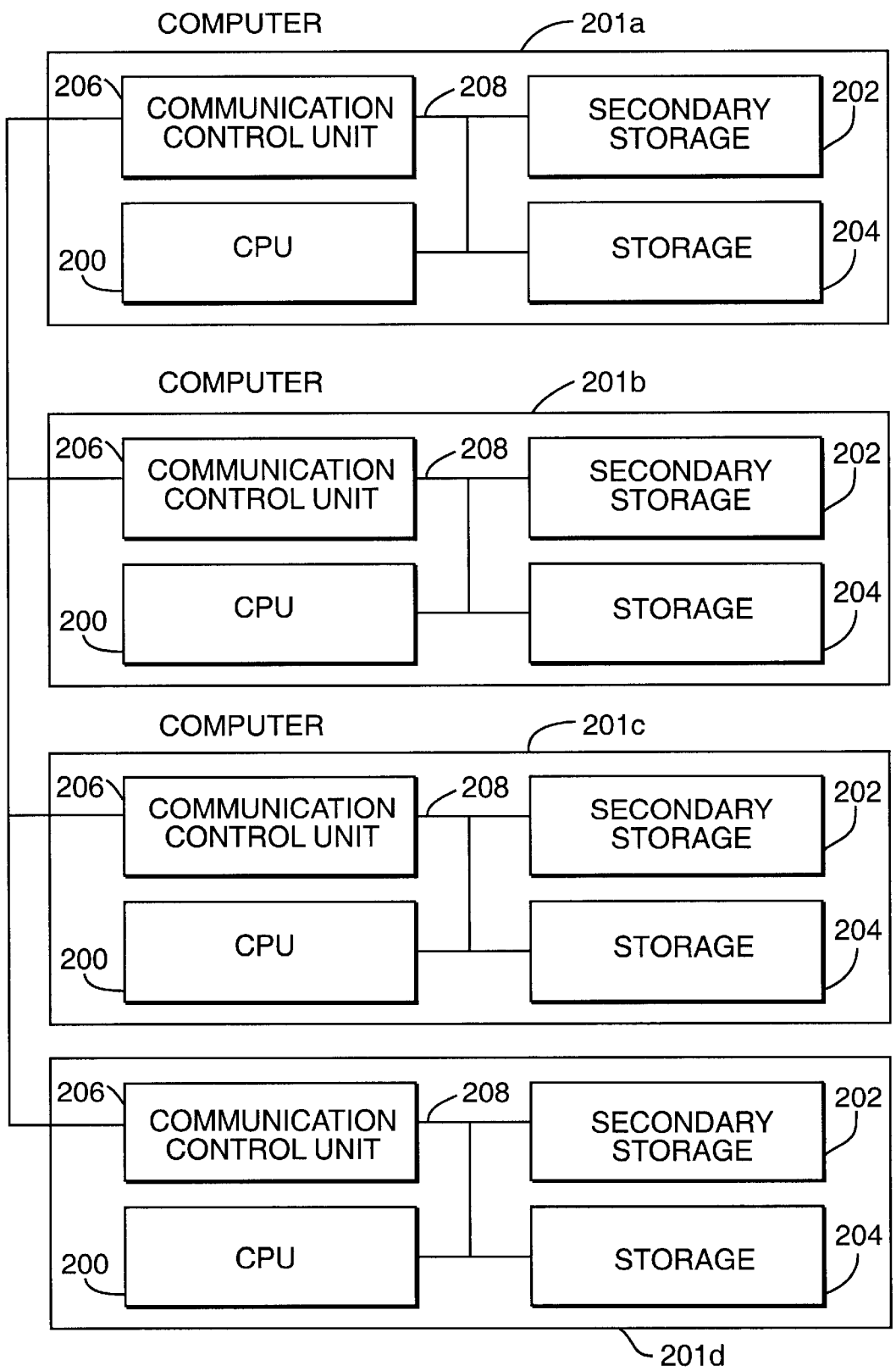
FIG. 3 is a hardware configuration for processing the client program 100, the proxy server program 108, and the server program 116 using a plurality of computers as distributed processings.

FIG. 3 illustrates a hardware configuration for processing the client program 100, the proxy server program 108, and the server program 116 using a plurality of computers as distributed processings. In FIG. 3, the client program 100 is processed by a computer 201a, the proxy server program 108 is processed by a computer 201b, and the server program 116 is processed by a computer 201c. A computer 201d will be discussed later. The computers 201a to 201d are the same as those in the hardware configuration shown in FIG. 2, except that each of them is provided with a communication control unit 206 (LAN adapter, terminal adapter (TA), etc.) used to communicate with each other via a communication network 203 such as a LAN. In this case, however, the client program 100, the proxy server program 108, and the server program 116 are stored separately in the secondary storage 202 of each corresponding computer (201a to 201c). Each of those programs is loaded and executed in the storage 204 by each corresponding computer CPU 200. In addition, a communication network 203 is used to transfer data mutually among those programs.

Although in the embodiment shown in FIG. 3, the client program 100, the proxy server program 108, and the server program 116 are processed separately in different computers, this invention is not limited to only this embodiment. For example, the proxy server program 108 and the server program 116 may be processed in the same computer and the client program 100 may be processed in another computer. The combination of the programs and the computers may also be varied freely.

Next, the relationship between the set of callable functions created by the proxy server program 108 and the set of callable functions 114 created by the server program 116 will be explained in conjunction with FIG. 4. Herein, a case where the proxy server program 108 is positioned between the client program 100 and two server programs 116-A and 116B will be explained.

As described already, the client program 100, the two server programs 116-A and 116B and the proxy server program 108 may operate in one and the same computer, and further, they may be either in one and the same process or in different processes.

Figure 4:
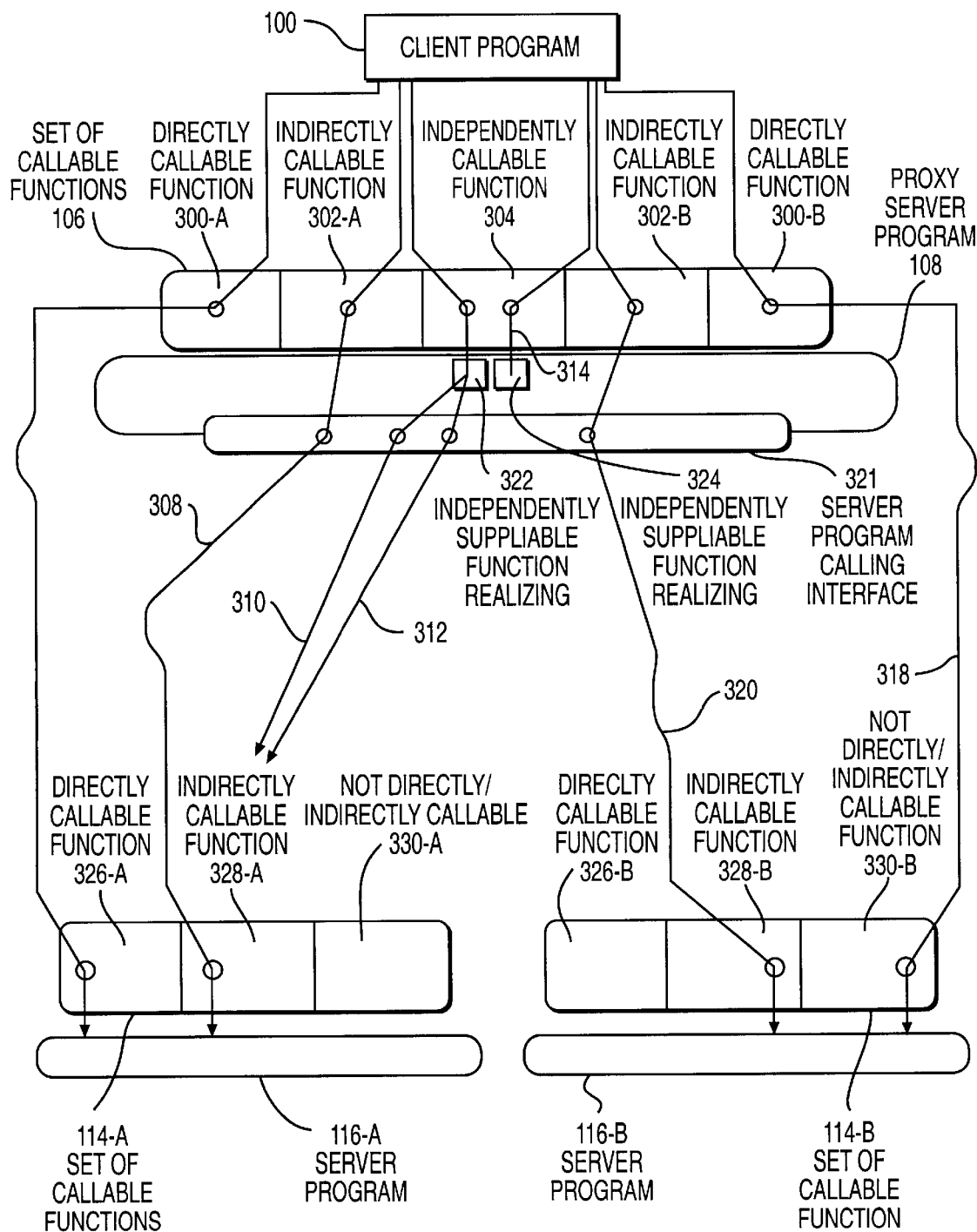
FIG. 4 illustrates a relationship between a set of callable functions 106, which are created in the proxy server program 108 and a set of callable functions 114, which are created in the server program 116.

Arrows drawn from the client program 100 in FIG. 4 indicate the same significance as those in FIG. 1.

The set of callable functions 106 created by the proxy server program 108 includes 3 types of partial sets. Namely, a set of directly callable functions 300 (300-A, 300-B), a set of indirectly callable functions 302 (302-A, 302-B), and a set of independently callable functions that can be supplied functions 304 are provided.

In the directly callable functions 300 are set calling addresses described in the set of callable functions 114 notified from the server program 116. More concretely, in the set of directly callable functions 300-A are set calling addresses described in the set of callable functions 114-A notified from the server program 116-A. And, in the set of directly callable functions 300-B are set calling addresses described in the set of callable functions 114-B notified from the server program 116-B.

More concretely, these sets are stored in the storage in the form of a table having arrayed addresses by the proxy server program 108. The client program 100 is provided with a pointer to the table.

Consequently, if the client program 100 accesses an address described in the set of directly callable functions 300 to request a function, the server program 116 processes and supplies the function directly to the client program 100 (refer to the arrows 306 and 318 in FIG. 4). In this case, the proxy server program 108 does not take part in the supply of the function to the client program 100.

In the indirectly callable function 302 is set an address for calling the function for accessing the address of the set of callable functions 114 notified from the server program 116. More specifically, in the set of indirectly callable functions 302-A are set addresses for calling the functions for accessing the addresses for calling the set of callable functions 114-A notified from the server program 116-A. In the set of indirectly callable functions 302-B are set addresses for calling the functions for accessing the addresses for calling the set of callable functions 114-B notified from the server program 116-B.

Consequently, when the client program 100 accesses an address described in the set of indirectly callable functions 302, the proxy server program 108 executes a necessary processing and accesses the corresponding address described in the set of callable functions 114 of the server program 116 via an interface 321 for calling the server program, which is provided in the proxy server program to request the server program 116 to supply the function, as if it was the client. Upon receiving the request, the server program 116 supplies the function to the client program 100 (refer to the arrows 308 and 320 in FIG. 4).

The set of independently callable functions that can be supplied functions 304 are set addresses for calling the functions that cannot be supplied from the server program 116, but can be supplied from the proxy server program. In the proxy server program 116 is set a module for supplying the functions specified by the addresses described in the set of independently callable functions that can be supplied functions 304. FIG. 4 shows a module 322 for realizing the supply of the functions that cannot be supplied from the server program 116 and a module 324 for realizing the supply of the functions that cannot be supplied from the server program 116 (refer to arrows 310 to 314 shown in FIG. 4). The module 324 for realizing the independently callable functions that can be supplied may be processed inside the proxy server program 108, may leave the processing to another computer via a network such as the computer 201d illustrated in FIG. 3, or may download a component from the computer 201d, followed by processing.

The set of callable functions 114 created by the server program 116, as shown in FIG. 4, includes 3 types of partial sets corresponding to each of the partial sets of the set of callable functions 106 created by the proxy server program 108. The set of directly callable functions 326 (326-A, 326-B) corresponds to the set of directly callable functions 300 (300-A, 300-B). More specifically, the addresses described in the set of directly callable functions 326-A match with the addresses described in the set of directly callable functions 300-A. In addition, the addresses described in the set of directly callable functions 326-B match with the addresses described in the set of directly callable functions 300-B.

The set of directly callable functions 328 (328-A, 328-B) corresponds to the set of indirectly callable functions 302 (302-A, 302-B). More specifically, the addresses described in the set of indirectly callable functions 328-A correspond to the addresses described in the indirectly callable functions 302-A, for calling the functions to access the addresses. In addition, the addresses described in the set of indirectly callable functions 328-B correspond to the addresses described in the set of indirectly callable functions 302-B, for calling the functions to access the addresses.

The set of directly/indirectly callable functions 330 (330-A, 330-B) is a partial set of addresses for calling the functions that are not included in either of the set of directly callable functions 326 or the set of indirectly callable functions 328, i.e., a partial set of the addresses for calling the functions that are supplied to the client program 100.

An example of what functions are directly callable functions, indirectly callable functions, and independently callable functions that can be supplied functions in the set of callable functions 106 of the proxy server program 108 when the server program 116 is used as a display driver will now be described. Usually, the display driver draws patterns on a display and a printer of a computer in which the display driver is installed according to the request of an application program. To use those functions as they are, the proxy server program sets the addresses for calling those functions described in the set of callable functions 114 of the display driver for directly callable functions, and provides the client program 100 with a pointer (address) to the table. Also, usually, the display driver does not support a function for drawing patterns on a plurality of displays. To draw patterns on a plurality of displays according to the request from an application program, for example, a module for realizing a function to request a drawing processing for a plurality of display drivers must be formed and the addresses for calling the module must be set for an independently callable function that can be supplied a function.

In addition, for example, if the number of times an application program requests supply of a function from the display driver is to be recorded, the address for accessing the address of the function, described in the set of callable functions 114 of the display driver is set for an indirectly callable function. Then, the proxy server program 108 records the number of accesses to the address set for the indirectly callable function.

Although the above explanation was made for a case that the proxy server program 108 is positioned between the client program 100 and two server programs 116-A and 116-B as shown in FIG. 4, the relationship between the set of callable functions 106 and the set of callable functions 114 is basically the same when only one server program 116 is used and when 3 or more server programs are used. And, when server programs 116-A and 116-B are proxy server programs between another server program and the proxy server program 108, it will be understood from the above explanation that the same effect can be achieved.

Figure 5:
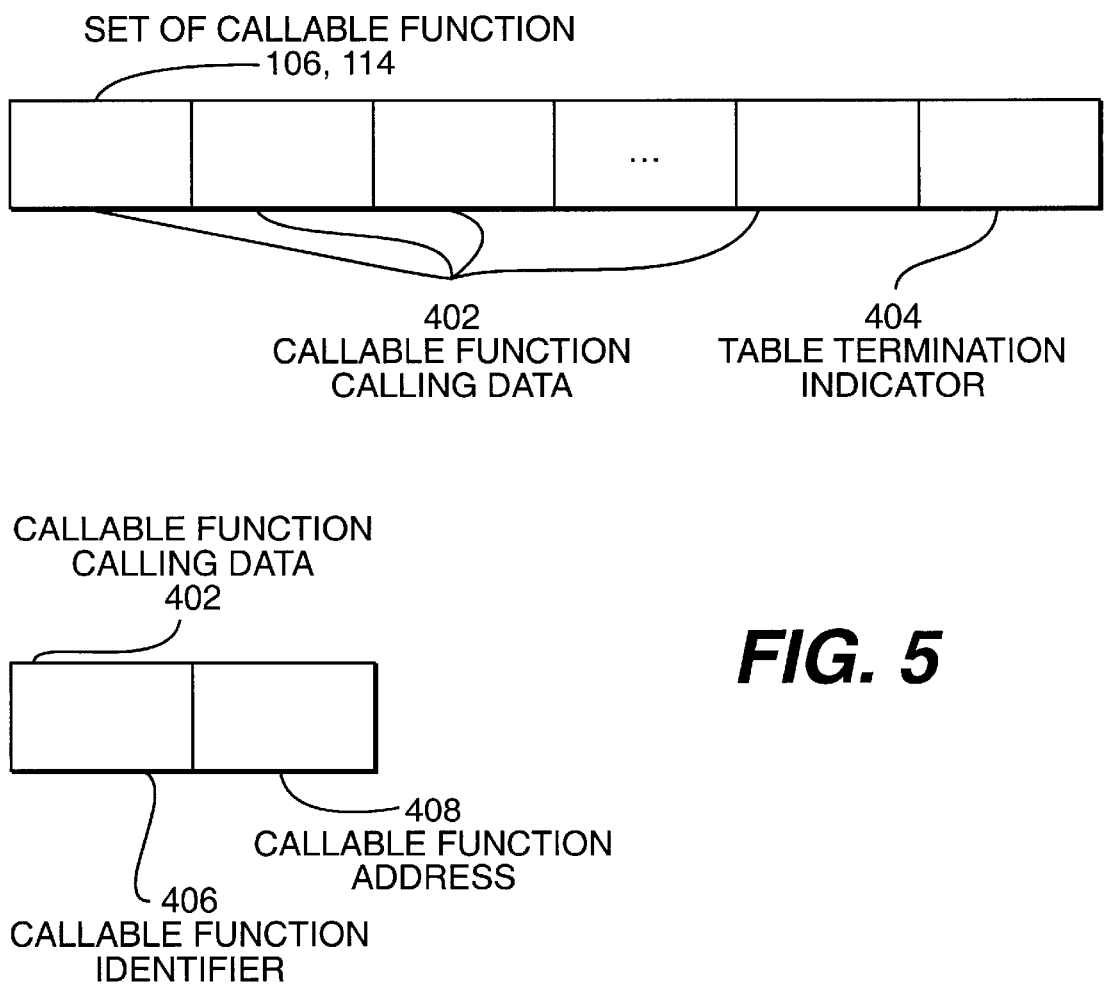
FIG. 5 illustrates a configuration of the set of callable functions 106 and a configuration of the set of callable functions 114.

Next, the configuration of each of the sets of callable functions 106 and 114 will be explained. FIG. 5 illustrates a configuration of the set of callable functions 106/114. The set of callable functions 106/114 is formed as a table having an array of callable function descriptors 402 and a table termination indicator 404 indicating the end of the array of the callable function descriptors 402. The callable function descriptors 402, when included in the set of callable functions 106, are information with which the client program 100 calls usable functions. When included in the set of callable functions 114, they are information with which the proxy server program 108 calls usable functions. A callable function descriptor 402 includes a callable function identifier 406 and a callable function calling address 408. The client program 100 and the proxy server program 108 use the callable function identifier 406 to search a target function and accesses the address 408 for calling the corresponding callable function to request supply of the target function. When the function to be called is known previously, the address 408 for calling the callable function may be replaced with a pointer for indicating the address based on the retrieval result in compiling the program.

Next, the operation of each program forming the client server system in this embodiment will be explained. As explained above, each program is loaded by a CPU from a secondary storage such as a magnetic disk and an optical disk into a storage such as a memory to be executed. Needless to say, the CPU actually runs the program.

Figure 6:
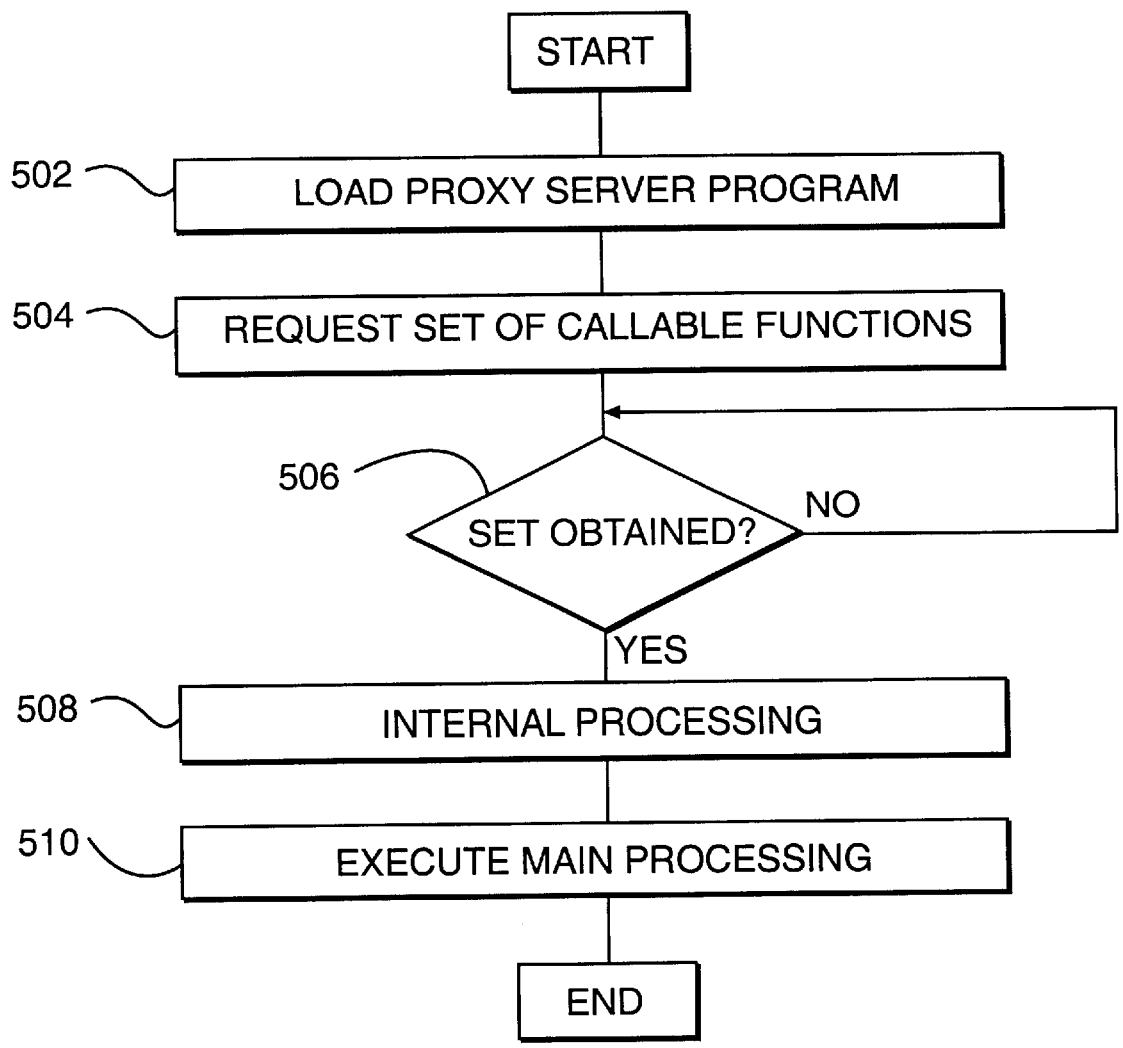
FIG. 6 is a flow chart explaining the operation of the client program 100.

At first, the operation of the client program will be explained. FIG. 6 is a flow chart explaining the operation of the client program 100. The client program 100 loads and starts up the proxy server program 108 (step 502). More concretely, at the request of the client program 100, the OS for managing the system loads it, and then, starts the operation. For example, an address to which the client program 100 refers, i.e., a registration address to a system for accessing the server program 116 is changed before the starting of the client program 100, so that the proxy server program 108 can be accessed instead of the server program 116. Then, the client program notifies the proxy server program 108 of the function that the client program 100 itself will use, to request the set of callable functions 106 (step 504).

As mentioned above, the client program 100 usually requests the set of callable functions to the server program 116, but in this embodiment, the address of the proxy server program 108 is given to the client program instead of the address of the server program. Thus, the client program 100 issues requests to the proxy server program 108 actually although it originally intends to issue requests to the server program 116.

After this, the client program 100, when obtaining the set of callable functions 106 (step 506), executes a necessary internal processing using this set of callable functions 106 (step 508), thereby completing the pre-processing. In the case of an event driving type program, an event loop is started from this step. Subsequently, the client program 100 executes its original processing (step 510). For example, the client program 100 accesses the address for calling a necessary function with reference to the obtained set of callable functions 106 and receives the function.

When the proxy server program 108 is installed in another computer, the client program 100 issues an instruction to the computer CPU via a communication network to start up the proxy server program 108. Then, the client program exchanges data with the started up proxy server program 108 via the communication network.

Figure 7:
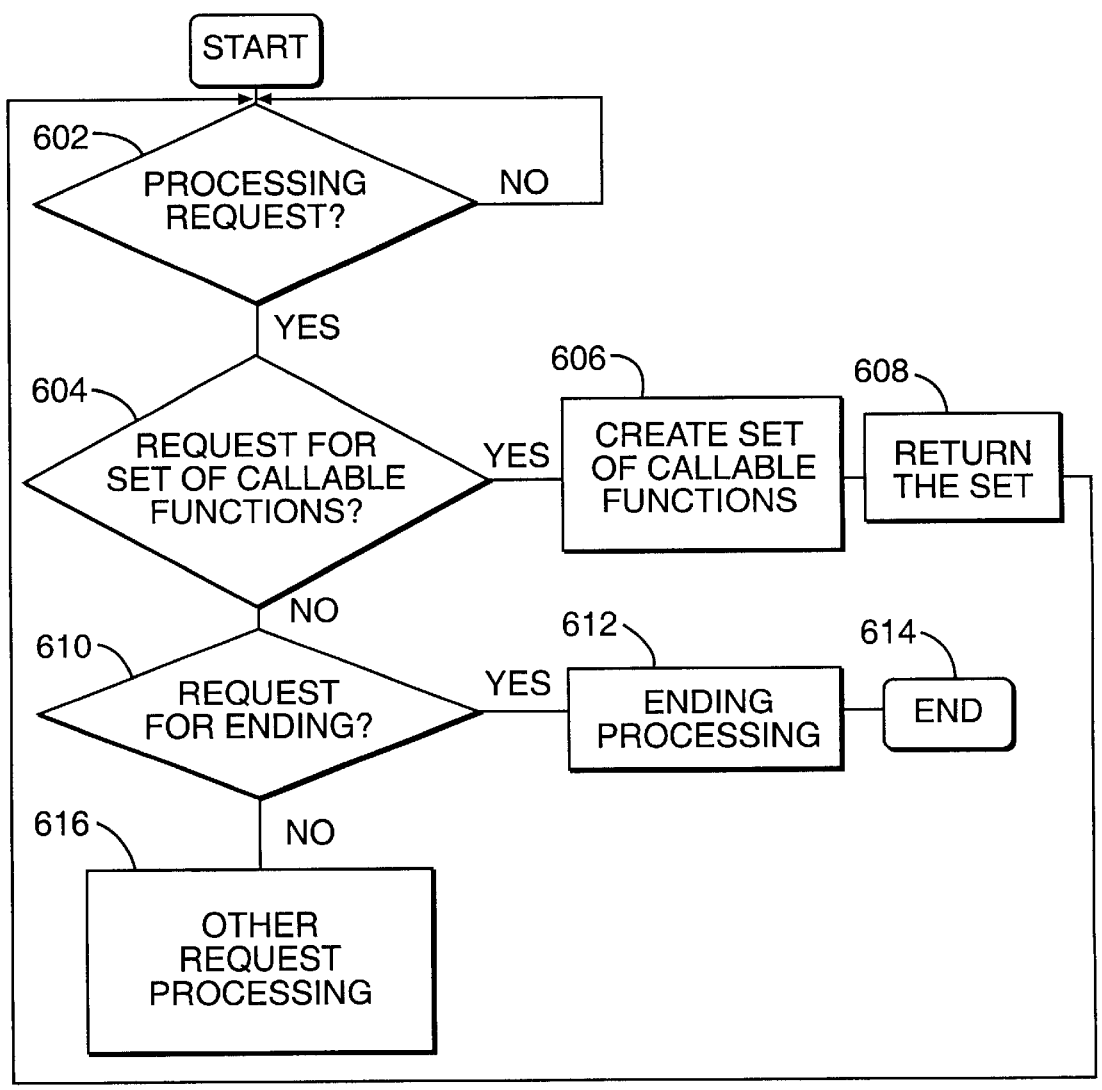
FIG. 7 is a flow chart explaining the operation of the server program 116.

Next, the operation of the server program 116 will be explained. FIG. 7 is a flow chart explaining the operation of the server program 116. The server program 116 waits for a request to be sent (step 602). If a request for the set of callable functions 114 is received from the proxy server program 108 (step 604), the server program 116 creates the set of callable functions 114 according to the contents of the function notified from the proxy server program 108 (step 606), then notifies the proxy server program of the created set of callable functions 114 (step 608). The contents to be reported may include at least the address as long as the table configuration has been already specified. If the table configuration is not specified, the contents contain a pair of "an address" and "a function name" corresponding to the address.

If a request for ending of the server program 116 is received from the proxy server program 108 (step 610), the server program 116 ends the program (step 612). Then, the CPU ends the operation of the server program 116 (step 614). Furthermore, if a request for accessing a calling address described in the set of callable functions 114 created by itself in step 606 is received, the server program 116 supplies the function specified by the address (step 616).

Figure 8:
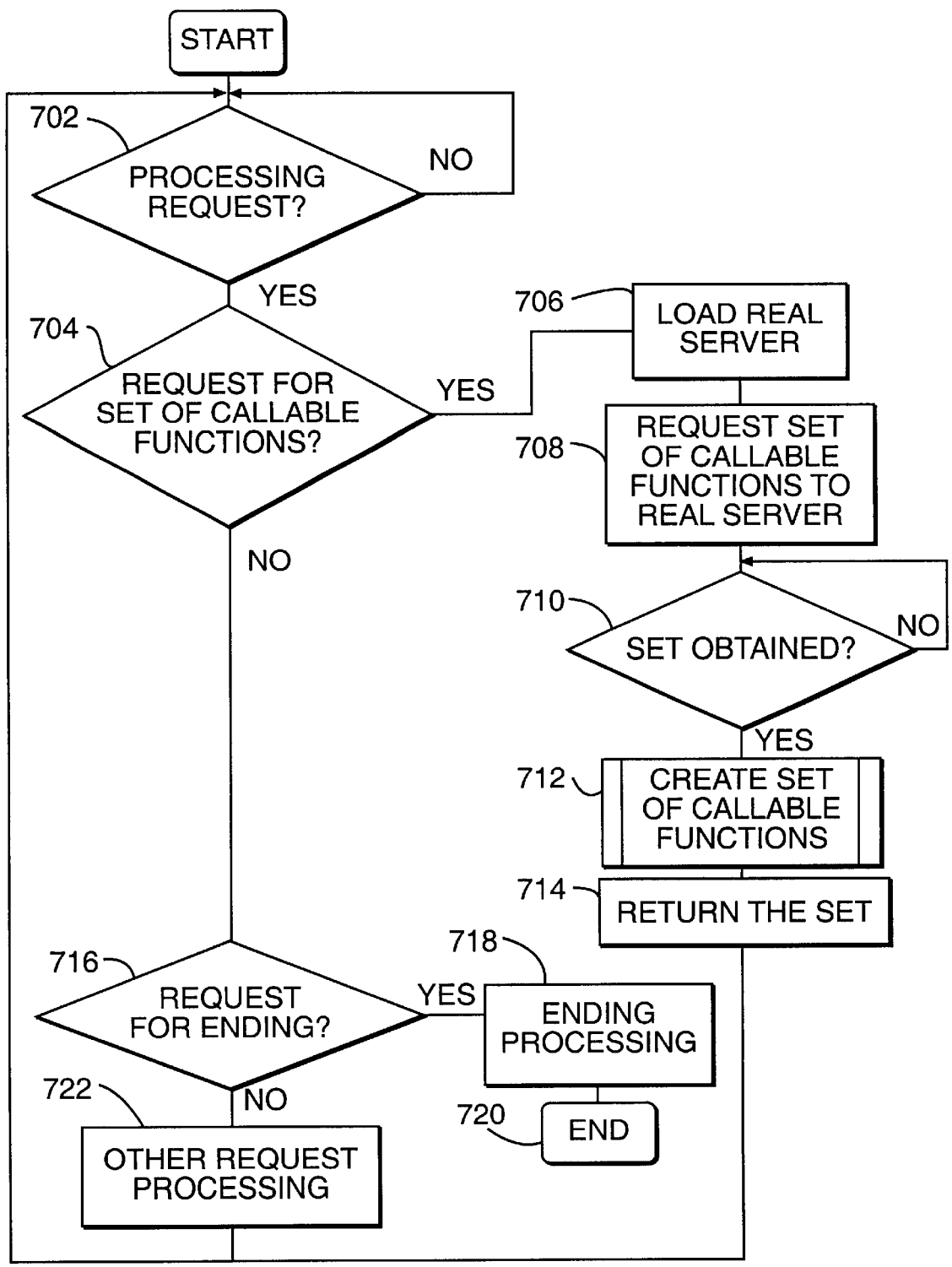
FIG. 8 is a flow chart explaining the operation of the proxy server program 108.

Next, the operation of the proxy server program 108 will be explained. FIG. 8 is a flow chart explaining the operation of the proxy server program 108. The operation illustrated in the flow chart is executed every time the program is loaded and started by the OS. For easier explanation, it is assumed, in this case, that the proxy server program 108 is positioned between the client program 100 and one server program 116.

At first, after various kinds of negotiations (such as communication of the function that can be supplied from the proxy server program 108 to the client program 100), the proxy server program 108 waits for a request to be sent from the client program 100 (step 702). If a request for the set of callable functions 106 is received from the client program 100 (step 704), the proxy server program 108 loads and starts up the server program 116, which is the master of the proxy server program (step 706). A plurality of server programs 116 may be called. Otherwise, although no program is called, the proxy server program 108 per se may perform the processing. After this, the proxy server program 108 notifies the server program 116 of the function notified from and to be used by the client program 100 to request the set of callable functions 114 (step 708). If the function to be used to request the set of callable functions is supposed to be a default one given a priori the client program may not be notified of it. Then, the proxy server program 108, when obtaining the set of callable functions 114 (step 710), creates the set of callable functions 106 that the proxy server program 108 itself is to notify to the client program 100 using this set of functions (step 712). Then, the proxy server program 108 notifies the client program 100 of the created set of callable functions 106 (step 714). This notification is given by, for example, copying the set of callable functions 106 in the storage 204 which can be accessed by the client program 100 and by returning an address of the copied set to the client program 100.

If a request for ending the proxy server program 108 is received from the client program 100 (step 716), the client server program 108 notifies the object server program 116 of the processing request and executes the ending processing (step 718). After this, the CPU ends the operation of the proxy server program 108 (step 720).

Furthermore, if a request for accessing an address described in the set of indirectly callable functions 302 or the set of independently callable functions that can be supplied functions 304 selected from the sets of callable functions 106 created by itself is received, the proxy server program 108 supplies the function specified by the address (step 722). If the request specifies accessing of an address described in the set of directly callable functions 300, the server program 116, which is the master of the proxy server program 108, supplies the function as explained above. Thus, the proxy server program 108 does not take part in the processing.

When the server program 116 is installed in another computer, the proxy server program 108 issues an instruction to the OS in the computer via a communication network to start up the server program 116. Then, the proxy server program 108 exchanges data with the started up server program 116 via the communication network.

Figure 9:
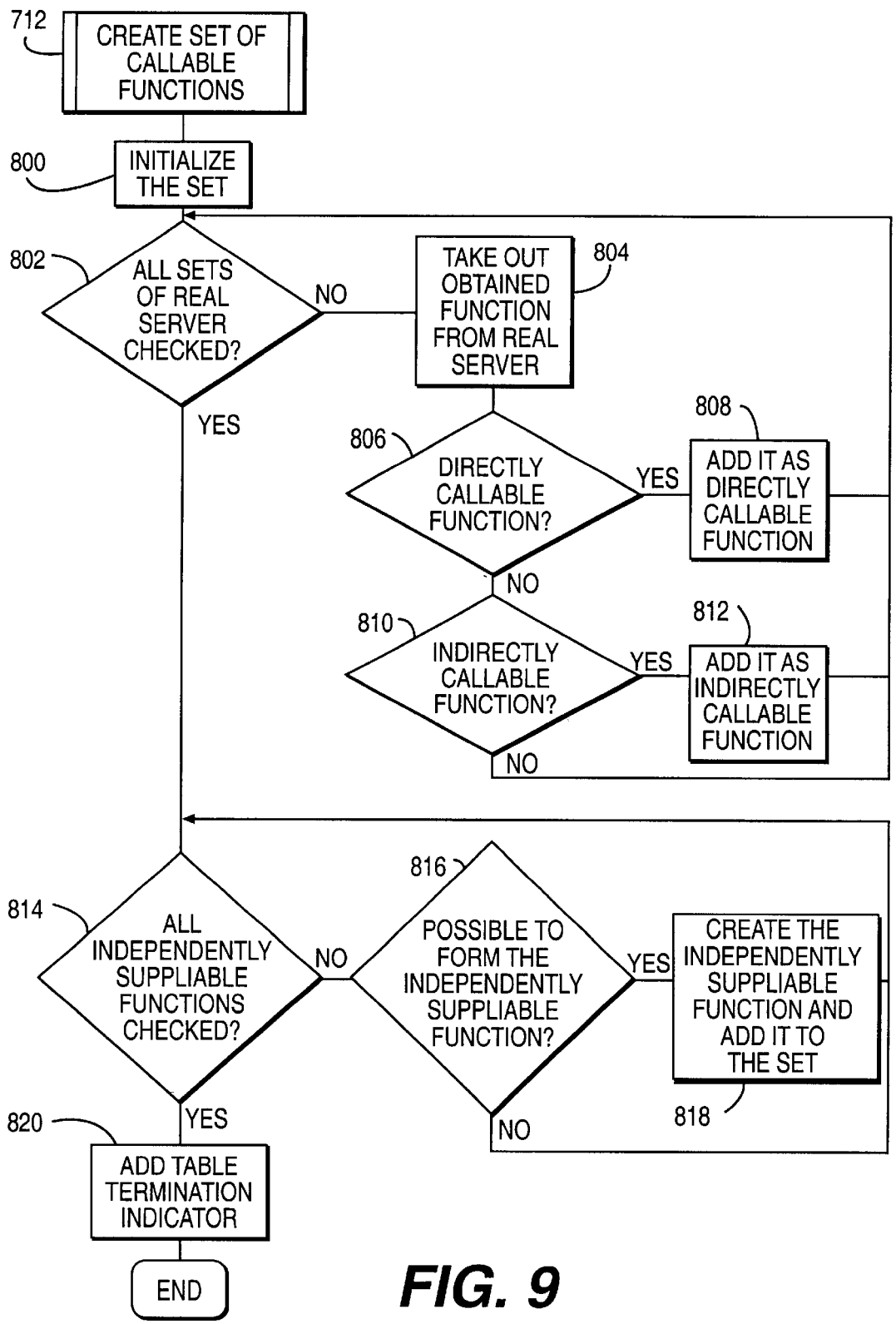
FIG. 9 is a flow chart explaining how the proxy server program 108 creates the set of callable functions 106.

Next, creating of the set of callable functions 106 in step 712 shown in FIG. 8 will be explained in detail. FIG. 9 is a flow chart explaining the operation of the proxy server program 108 for creating the set of callable functions 106. At first, the proxy server program 108 initializes the set of callable functions 106 (step 800). Then, in steps 802 to 812, the proxy server program 108 checks the contents of the callable function descriptors 402 described in the set of callable functions 114 notified from the server program 116 and creates the set of callable functions according to the result of the check.

In step 802, the proxy server program 108 determines whether or not the check is ended for all the callable function descriptors 402 described in the set of callable functions 114. If not ended, the program 108 goes to step 804 to obtain the non-checked callable function descriptors 402 from the set of callable functions 114.

In step 806, the proxy server program 108 determines whether or not the callable function descriptor 402 fetched in step 804 corresponds to the directly callable function for the proxy server program 108. For example, if the function specified by the callable function descriptor 402 is the very function to be executed by the server program 116 and the proxy server program 108 does not take part in the processing of the function when the server program 116 processes the function, the proxy server program 108 decides the function to be a directly callable function. In this case, the proxy server program 108 adds the callable function descriptor 402 fetched in step 804 to the set of callable functions 106 as they are (step 808), then returns to step 802.

In step 810, it is decided whether or not the descriptor 402 fetched in step 804 corresponds to an indirectly callable function for the proxy server program 108. For example, if the function specified by the callable function descriptor 402 is the very function to be executed by the server program 116 and the proxy server program 108 takes part in the processing of the function when the server program 116 processes the function, it is decided that the function is an indirectly callable function. In this case, the proxy server program 108 creates a callable function descriptor 402 corresponding to the callable function descriptor fetched in step 804, that is, a callable function descriptor 402 including an address of the function for accessing the callable function descriptor 402 fetched in step 804 and adds this descriptor to the set of callable functions 106 (step 812), then returns to step 802.

The callable function descriptor 402, once determined not to correspond to any of directly callable functions and indirectly callable functions in steps 806 and 810, is a descriptor of a function that the server program 116 is disabled for supplying, although the server program 116 can supply the function. In this embodiment, functions that are not supplied from the server program 116 are not added to the set of callable functions 106, thereby resulting in the supply of the reduced set of functions from the server program 116.

The proxy server program 108, after ending the check for all of the callable function descriptions 402 described in the set of callable functions 114 notified from the server program 116, checks whether or not the program 108 itself can supply the function notified from the client program 100 in steps 814 to 818, then creates the set of callable functions 106 according to the result of the check.

In step 814, it is decided whether or not the proxy server program 108 has ended the check for all of the functions that can be supplied from the program 108 itself independently. If not ended, the program 108 goes to step 816 to check whether or not the function that can be supplied from the program 108 independently is related to the function notified from the client program 100. If determined to be related, the proxy server program 108 further checks whether or not the function can be formed using the module owned by the proxy server program 108 or the set of callable functions 114 notified from the server program 116 (in step 816). If it is determined that it can be formed, the proxy server program 108 goes to step 818 to form the function actually and adds the descriptor 402 of the function to the set of callable functions 106.

The proxy server program 108, after ending the check for all of the functions that the program 108 itself can supply on its own terms, adds a table termination indicator 404 to the callable function descriptor 106 (in step 820). This completes the creation of the set of callable functions 106 to be notified from the proxy server program 108 to the client program 100.

As described above, upon completion of the creation of the set of callable functions 106, for example, the set of callable functions 106 is copied in the storage 204 which can be accessed by the client program 100, and thus, the address of the copied set is returned to the client program 100.

As explained above, the client program 100 accesses the address of the descriptor of the necessary function, selected from the descriptors 402 described in the set of callable functions 106 notified from the proxy server program 108, to request the supply of the function. This way, the functions to be supplied to the client program 100 can be increased and reduced without amending the existing client program 100 and server program 116.

According to the present invention, old software can be actuated by new hardware, and further, software corresponding to new hardware can be actuated by old hardware.

Furthermore, if a function of verifying the operation of the software is supplied from the proxy server program, a debugging tool can be constituted.

The present invention is oriented to the software to be actuated in a computer, and accordingly, it is possible to distribute the software via a portable recording medium or a network from a server connected to the computer.

While the present invention has been described above in conjunction with the preferred embodiments, one of ordinary skill in the art would be enabled by this disclosure to make various modifications to these embodiments and still be within the scope and spirit of the present invention as recited in the appended claims.

What is claimed is:

1. A proxy server for use with a client server system comprising a client and a server that notifies requester of information used for accessing a function that said server can supply according to a request from said requester and supplies a function corresponding to said information accessed, wherein said proxy server instead of said server notifies said client of said information, and comprises
first means of obtaining from said server first information used for accessing a function that said server can supply to said client according to a request from said client;
second means of creating second information used for accessing a function that said client can use, with reference to said obtained first information; and
third means of notifying said client of said created second information responding to said request, and
wherein said proxy server is capable of independently supplying some functions to said client without involving said server.

2. A proxy server as defined in claim 1, wherein said first means creates said second information including at least one information described in said first information obtained.

3. A proxy server as defined in claim 1, wherein said first means creates said second information including an address for accessing at least one information described in said first information obtained.

4. A proxy server for use with a client server system comprising a client and a server that notifies requester of information used for accessing a function that said server can supply according to a request from said requester and supplies a function corresponding to said information accessed, wherein said proxy server instead of said server notifies said client of said information, and comprises first means of obtaining from said server first information used for accessing a function that said server can supply to said client according to a request from said client;

second means of creating second information used for accessing a function that said client can use, with reference to said obtained first information; and third means of notifying said client of said created second information responding to said request, and wherein said first means creates entry information used for accessing a function enabled for said client to use, said entry information excluding at least one address described in entry information obtained from said server and used for accessing a function that can be supplied from said server to said client or an address for accessing said address.

5. A recording medium for use with a client server system comprising a client program and a server program that notifies a requester of information used for accessing a function that said server program can supply according to a request from said requester and supplies a function corresponding to said information accessed, wherein said recording medium storing a proxy server program that notifies said client program of said information, and said proxy server program instructs an information processing unit to execute processings in steps of;

obtaining from said server program first information used for accessing a function that said server program can supply to said client program according to a request from said client program;

creating second information used for accessing a function that said client program can use, with reference to said obtained first information; and notifying said client program of said created second information responding to said request, and wherein said proxy server program is capable of providing certain functions to said client program without involving said server program.

6. A recording medium storing a proxy server program, as defined in claim 5, wherein said second information includes at least one address described in entry information obtained from said server program and used for accessing a function that can be supplied from said server program to said client program.

7. A recording medium storing a proxy server program, as defined in claim 5, wherein said second information includes at least one address described in entry information obtained from said server program and used for accessing a function that can be supplied from said server program to said client program.

8. A recording medium for use with a client server system comprising a client program and a server program that notifies a requester of information used for accessing a function that said server program can supply according to a request from said requester and supplies a function corresponding to said information accessed, wherein said recording medium storing a proxy server program that notifies said client program of said information, and said proxy server program instructs an information processing unit to execute the steps of;

obtaining from said server program first information used for accessing a function that said server program can supply to said client program according to a request from said client program;

creating second information used for accessing a function that said client program can use, with reference to said obtained first information; and notifying said client program of said created second information responding to said request, and wherein entry information used for accessing a function enabled for said client program to use does not include at least one address described in entry information obtained from said server program and used for accessing a function that can be supplied from said server program to said client program or an address for accessing said address.

9. In a system including at least one server and at least one client, a proxy server functioning as an intermediary between said server and said client, the proxy server comprising:

means for creating and notifying said client of entry information for accessing a desired function, in response to a request from said client; and means for providing said desired function to said client in response to access via said entry information, wherein said proxy server is capable of independently supplying some functions to said client without involving said server.

10. A proxy server as defined in claim 9, wherein said desired function is one supplied by said server.

11. A recording medium having stored thereon a client program, a server program and a proxy server program, said proxy server program performing the steps of:

notifying said client program of entry information for accessing a function provided by said server program;

instructing an information processing unit to execute the steps of:

obtaining from said server program first information used for accessing a function that said server program can supply to said client program according to a request from said client program;

creating second information used for accessing a function that said client program can use, with reference to said obtained first information;

notifying said client program of said created second information responding to said request; and in certain instances, directly providing certain functions to said client program without involving said server program.

12. A recording medium storing a proxy server program, as defined in claim 11, wherein said second information includes at least one address described in entry information obtained from said server program and used for accessing a function that can be supplied from said server program to said client program.

13. A recording medium having stored thereon a client program, a server program and a proxy server program, said proxy server program performing the steps of:

notifying said client program of entry information for accessing a function provided by said server program;

instructing an information processing unit to execute the steps of:

obtaining from said server program first information used for accessing a function that said server program can supply to said client program according to a request from said client program;

creating second information used for accessing a function that said client program can use, with reference to said obtained first information;

notifying said client program of said created second information responding to said request; and wherein entry information used for accessing a function enabled for said client program to use does not include at least one address described in entry information obtained from said server program and used for accessing a function that can be supplied from said server program to said client program or an address for accessing said address.

14. A system comprising:

a server capable of performing a set of functions;

a client; and a proxy server logically positioned at least partially between the server and the client;

wherein the proxy server provides a set of callable functions for the client, and wherein some of the set of functions that the server is capable of performing are intentionally deleted by the proxy server from the set of callable functions it provides to the client.

15. The system according to claim 14, wherein the proxy server is capable of providing some functions directly to the client without involving the server.

16. The system according to claim 14, wherein the server provides some functions directly to the client without involving the proxy server.

17. The system according to claim 15, wherein the server provides some functions directly to the client without involving the proxy server.

18. The system according to claim 14, wherein the server effectively functions as a second proxy server logically positioned at least partially between another server and the proxy server.

19. The system according to claim 17, wherein the server effectively functions as a second proxy server logically positioned at least partially between another server and the proxy server.

20. The system according to claim 14, wherein the server is one of a plurality of servers, and wherein the proxy server is logically connected at least partially between each of the plurality of servers and the client.

* * * * *